(12) United States Patent
Hansen et al.

(10) Patent No.: US 7,194,454 B2
(45) Date of Patent: Mar. 20, 2007

(54) METHOD FOR ORGANIZING RECORDS OF DATABASE SEARCH ACTIVITY BY TOPICAL RELEVANCE

(75) Inventors: Mark H. Hansen, Hoboken, NJ (US); Elizabeth A. Shriver, Jersey City, NJ (US)

(73) Assignee: Lucent Technologies, Murray Hill, NJ (US)

( * ) Notice: Subject to any disclaimer, the term of this patent is extended or adjusted under 35 U.S.C. 154(b) by 372 days.

(21) Appl. No.: 10/096,688

(22) Filed: Mar. 12, 2002

(65) Prior Publication Data

US 2003/0014399 A1 Jan. 16, 2003

Related U.S. Application Data

(60) Provisional application No. 60/275,068, filed on Mar. 12, 2001.

(51) Int. Cl.
*G06F 17/30* (2006.01)

(52) U.S. Cl. ................ 707/3; 707/2; 707/4; 707/5; 707/102

(58) Field of Classification Search .............. 707/1–10, 707/100–104.1, 200–206; 706/55; 704/9; 715/505; 709/224
See application file for complete search history.

(56) References Cited

U.S. PATENT DOCUMENTS

| | | | | |
|---|---|---|---|---|
| 6,076,051 | A * | 6/2000 | Messerly et al. | 704/9 |
| 6,311,194 | B1 * | 10/2001 | Sheth et al. | 715/505 |
| 6,556,983 | B1 * | 4/2003 | Altschuler et al. | 706/55 |
| 6,687,696 | B2 * | 2/2004 | Hofmann et al. | 707/6 |
| 6,741,990 | B2 * | 5/2004 | Nair et al. | 707/9 |
| 6,981,040 | B1 * | 12/2005 | Konig et al. | 709/224 |

OTHER PUBLICATIONS

*Classifying Content with Ultraseek Server CCE*, pp. 1-8.
Robert Armstrong, Dayne Freitag, Thorsten Joachims, and Tom Mitchell, *WebWatcher: A Learning Apprentice for the World Wide Web*, Proceedings of the 1995 AAAI Spring Symposium on Information Gathering from Heterogeneous, Distributed Environments (Palo Alto, CA), pp. 6-12, Mar. 1995.
Giuseppe Attardi, Antonio Gulli and Fabrizio Sebastiani, *Theseus: Categorization by Context*, Proceedings of the Eighth International World Wide Web Conference (WWW8) (Toronto, Canada), Elsevier Science, pp. 1-2, May 1999.
Marko Balabanovic and Yoav Shoham, *Fab: Content-Based, Collaborative Recommendation*, Communications of the ACM, vol. 40, No. 3, pp. 66-72, Mar. 1997.

(Continued)

*Primary Examiner*—Yicun Wu (57) ABSTRACT

A method for organizing records of a database by topical relevance generates statistics on relevance by monitoring search terms used and search paths traversed by a database user community. Records reviewed most often in relation to a given search term are assumed to be most relevant to that search term in the eyes of members of the user community. Additionally, a record reviewed in relation to a plurality of search terms is determined to be related by topical relevance to other records reviewed in relation to that plurality of search terms. Again, a probability is calculated, based on a frequency of record review and search terms used, as a measure of this record topical relevance. An embodiment directed toward Internet searches provides for seeding the probability calculations with information from labeled data available from open source Internet directories. The activities of the user community are monitored, for example, at a proxy server, or by reviewing proxy server logs. Other monitoring points are contemplated.

23 Claims, 5 Drawing Sheets

OTHER PUBLICATIONS

Doug Beeferman and Adam Berger, *Agglomerative Clustering of a Search Engine Query Log*, Proceedings of the 2000 Conference on Knowledge Discovery and Data Mining (Boston, MA), pp. 407-416, Aug. 2000.

Johan Bollen, *Group User Models for Personalized Hyperlink Recommendations*, Proceedings of the Adaptive Hypermedia and Adaptive Web-Based Systems International Conference (AH2000) (Trento, Italy), pp. 38-50, Aug. 2000.

P.S. Bradley, Usama Fayyad, and Cory Reina, *Scaling Clustering Algorithms to Large Databases*, Proceedings of the Fourth International Conference on Knowledge Discovery and Data Mining (KDD-98) (New York City, NY), pp. 9-15, AAAI Press, Jun. 1998.

Sergey Brin and Lawrence Page, *The Anatomy of a Large-Scale Hypertextual Web Search Engine*, Proceedings of the Seventh International World Wide Web Conference (WWW7) (Brisbane, Australia), pp. 107-117, Elsevier Science, Apr. 1998.

Soumen Chakrabarti, Byron Dom, Prabhakar Raghavan, Sridhar Rajagopalan, David Gibson, and Jon Kleinberg, *Automatic Resource Compilation by Analyzing Hyperlink Structure and Associated Text*, Proceedings of the Seventh International World Wide Web Conference (WWW7) (Brisbane, Australia), Elsevier Science, Apr. 1998.

Jeffrey Dean and Monika R. Henzinger, *Finding Related Pages in the World Wide Web*, Proceedings of the Eighth International World Wide Web Conference (WWW8) (Toronto, Canada), pp. 389-401, Elsevier Science, May 1999.

A. P. Dempster, N. M. Laird and D. B. Rubin, *Maximum Likelihood from Incomplete Data via the EM Algorithm*, Journal of the Royal Statistical Society, 39(B), pp. 1-38, 1977.

David Gibson, Jon Kleinberg and Prabhakar Raghavan, *Inferring Web Communities from Link Topology*, Proceedings of the 9th ACM Conference on Hypertext and Hypermedia: Links, Objects, Time and Space-Structure in Hypermedia Systems (Pittsburgh, PA), pp. 225-234, Jun. 1998.

Ayse Göker and Daqing He, *Analysing Web Search Logs to Determine Session Boundaries for User-Oriented Learning*, Proceedings of the Adaptive Hypermedia and Adaptive Web-Based Systems International Conference (AH2000) (Trento, Italy), pp. 319-322, Aug. 2000.

Thorsten Joachims, Dayne Freitag, and Tom Mitchell, *WebWatcher: A Tour Guide for the World Wide Web*, Proceedings of 15th International Joint Conference on Artificial Intelligence (IJCAI97) (Nagoya, Japan), pp. 770-777, Morgan Kaufmann, Aug. 1997.

Steve Lawrence and C. Lee Giles, *Inquirus, the NECI Meta Search Engine*, Proceedings of the Seventh International World Wide Web Conference (WWW7) (Brisbane, Australia), pp. 95-105, Elsevier Science, Apr. 1998.

R. Lempel and S. Moran, *The Stochastic Approach for Link-Structure Analysis (SALSA) and the TKC Effect*, Proceedings of the Ninth International World Wide Web Conference (WWW9) (Amsterdam, Netherlands), pp. 387-401, May 2000.

Paul P. Maglio and Rob Barrett, *How to Build Modeling Agents to Support Web Searchers*, Proceedings of the Sixth International Conference on User Modeling (UM97) (Sardinia, Italy), Springer Wien, New York, pp. 5-16, Jun. 1997.

Udi Manber, Mike Smith, and Burra Gopal, *WebGlimpse—Combining Browsing and Searching*, Proceedings of the 1997 USENIX Annual Technical Conference (Anaheim, CA), pp. 195-206, Jan. 1997.

Dharmendra S. Modha and W. Scott Spangler, *Clustering Hypertext with Applications to Web Searching*, Proceedings of the ACM Hypertext 2000 Conference (San Antonio, TX), pp. 143-152, May 2000.

Tsuyoshi Murata, *Discovery of Web Communities Based on the Co-occurence of References*, Proceedings of the Third International Conference on Discovery Science (DS '2000) (Kyoto, Japan), pp. 65-75, Dec. 2000.

Radford M. Neal and Geoffrey E. Hinton, *A View of the EM Algorithm that Justifies Incremental, Sparse, and Other Variants*, M. I. Jordan, editor, Learning in Graphical Models, pp. 355-368, Kluwer Academic Publishers, 1998.

Wanda Pratt, Marti A. Hearst, and Lawrence M. Fagan, *A Knowledge-Based Approach to Organizing Retrieved Documents*, Proceedings of the 6th National Conference on Artificial Intelligence (AAAI-99); Proceedings of the 11th Conference on Innovative Applications of Artificial Intelligence (Orlando, FL), pp. 80-85, AAAI/MIT Press, Jul. 1999.

Masa-aki Sato and Shin Ishii, *On-line EM Algorithm for the Normalized Gaussian Network*, Neutral Computation, 12,(2), pp. 407-432, Feb. 2000.

Eric Selberg and Oren Etzioni, *The MetaCrawler Architecture for Resource Aggregation on the Web*, IEEE Expert, 12(1), pp. 8-14, Jan./Feb. 1997.

Bo Thiesson, Christopher Meek, and David Heckerman, *Accelerating EM for Large Databases*, Technical Report, Microsoft Research, pp. 1-25, May 1999 (Revised Feb. 2001).

Walter Underwood, *Classifying Content with Inktomi Search CCE Module*, http://www.inktomi.com/products/se . . . products/ultraseek/cce/concept.htm, pp. 1-5, printed Mar. 15, 2002.

Ke Wang, Senqiang Zhou, and Shiang Chen Liew, *Building Hierarchical Classifiers Using Class Proximity*, Proceedings of the Twenty-fifth International Conference on Very Large Databases (Edinburgh, Scotland, UK), pp. 363-374, Sep. 1999.

Yiming Yang and Xin Liu, *A Re-examination of Text Categorization Methods*, Proceedings of SIGIR-99, 22nd ACM International Conference on Research and Development in Information Retrieval (Berkeley, CA), pp. 42-49, ACM, Aug. 1999.

Budi Yuwono and Dik Lun Lee, *WISE: A World Wide Web Resource Database System*, IEEE Transactions on Knowledge and Data Engineering, vol. 8, No. 4, pp. 548-554, Aug. 1996.

Budi Yuwono and Dik L. Lee, *Server Ranking for Distributed Text Retrieval Systems on the Internet*, Proceedings of the 5th International Conference on Database Systems for Advanced Applications (DASFAA '97 ) (Melbourne, Australia), pp. 41-49, Apr. 1997.

Oren Zamir and Oren Etzioni, *Web Document Clustering: A Feasibility Demonstration*, Proceedings of the 21st Annual International ACM SIGIR Conference on Research and Development in Information Retrieval (SIGIR '98) (Melbourne, Australia), pp. 46-54, ACM, Aug. 1998.

Tian Zhang, Raghu Ramakrishnan, and Miron Livny, *BIRCH: An Efficient Data Clustering Method for Very Large Databases*, Proceedings of the ACM SIGMOD International Conference on Management of Data (Montreal, Canada), pp. 103-114, Jun. 1996.

\* cited by examiner

FIG. 1

110
114  118  122  124 124
135.104.46.10  02/Dec/2000:01:48:55  "GET http://www.google.com/search?q=infocom+2000"
135.104.46.10  02/Dec/2000:01:49:03  "GET http://www.ieee-infocom.org/2000/"
135.104.46.10  02/Dec/2000:01:49:27  "GET http://www.ieee-infocom.org/2000/program.html"

FIG. 2

210
214  218
8  infocom+2000  http://www.ieee-infocom.org/2000/
24 infocom+2000  http://www.ieee-infocom.org/2000/program.html

METHOD FOR ORGANIZING RECORDS OF DATABASE SEARCH ACTIVITY BY TOPICAL RELEVANCE

This application claims the benefit of Provisional Application Ser. No. 60/275,068, filed Mar. 12, 2001, the entire substance of which is incorporated herein by reference.

BACKGROUND OF THE INVENTION

The invention is related to the art of data search. It is described in reference to World Wide Web and Internet searching. However, those of ordinary skill in the art will understand that the described embodiments can readily be adapted to other database or data search tasks.

A great deal of work is being done to improve database and Web searching. For example, Ayse Goker and Daqing He, in Analyzing Web Search Logs to Determine Session Boundaries for Unoriented Learning, *Proceedings of the Adaptive Hypermedia and Adaptive Web-Based Systems International Conference* (Trento, Italy), pages 319–322, August 2000, incorporated herein by reference in its entirety, defines a search session to be a meaningful unit of activities, with the intention of using it as input for a learning technique. Sessions are determined by a length in time from the first search query. Goker reports that a session boundary of 11–15 minutes compares well with human judgment. This is a simple model, and does not allow for determining which events in the time window correspond to Web searching. Additionally Goker analyzed logs from search engines only.

Johan Bollen, in Group User Models for Personalized Hyperlink Recommendation, *Proceedings of the Adaptive Hypermedia and Adaptive Web-Based Systems International Conference* (Trento, Italy), pages 39–50, August 2000, incorporated herein by reference in its entirety, presents a method to reconstruct user searching using the Web server log entries of the Los Alamos Research Library corresponding to access to the digital library of journal articles. The resulting retrieval paths are a group user model. The group user model is used to construct relationships between journals using a V×V matrix, where V is the set of hypertext pages. In this library of journal articles, a journal article is represented by a URL (Universal Resource Locator). This approach will not scale well and would be overwhelmed when V is the set of publicly-accessed URLs.

Many techniques exist for automatically determining the category of a document based on its content (e.g., Yiming Yang and Xin Liu, in A Re-Examination of Text Categorization Methods, *Proceedings of SIGIR-99, 22nd ACM International Conference on Research and Development in Information Retrieval* (Berkeley, Calif.), pages 42–49, ACM, August 1999 and its references, all of which are incorporated herein by reference in their entirety) and the in- and out-links of the document. For example, Jeffrey Dean and Monika R. Henzinger in Finding Related Web Pages in the World Wide Web, *Proceedings of the Eighth International World Wide Web Conference* (*WWW*8) (Toronto, Canada), pages 389–401, Elsevier Science, May 1999, incorporated herein by reference in its entirety, Dharmendra S. Modha and W. Scott Spangler, in Clustering Hypertext with Applications to Web Searching, *Proceedings of the ACM Hypertext 2000 Conference* (San Antonio, Tex.), May 2000, incorporated herein by reference in its entirety, Attardi et al. Giuseppe Attardi, Antonio Gulli, and Fabrizio Sebastiani, in Theseus: Categorization by Context, *Proceedings of the Eighth International World Wide Web Conference* (*WWW*8) (Toronto, Canada), pages 389–401, *Elsevier Science,* May 1999, incorporated herein by reference in its entirety, the context surrounding a link in an HTML document to extract information for categorizing the document referred by the link. Oren Zamir and Oren Etzioni, in Web Document Clustering: A Feasibility Demonstration, *Proceedings of the 21st Annual International ACM SIGIR Conference on Research and Development in Information Retrieval (SIGIR '98)* (Melbourne, Australia), pages 46–54, ACM, August 1998, incorporated herein by reference in its entirety, use the snippets of text returned by search engines to quickly group the results based on phrases shared between documents. Murata Tsuyoshi Murata, in Discovery of Web Communities Based on the Co-Occurrence of References, *Proceedings of the Third International Conference on Discovery Science (DS'2000)* (Kyoto, Japan), December 2000, incorporated herein by reference in its entirety, computes clusters of URLs returned by a search engine by entering the URLs themselves as secondary queries.

Clusters of similar Web pages can be developed using the approach presented by Dean and Henzinger, which finds pages similar to a specified one by using connectivity information on the Web. The Context Classification Engine catalogs documents with one or more categories from a controlled set. For example, see Classifying Content with Ultraseek Server CCE by Walter Underwood of Inktomi Search Software CCE, Foster City, Calif., incorporated herein by reference in its entirety. The categories can be arranged in either a hierarchical or enumerative classification scheme. Finally, DynaCat, by Wanda Pratt, Marti A. Hearst, and Lawrence M. Gagan in A Knowledge-Based Approach to Organizing Retrieved Documents, *Proceedings of the 6th National Conference on Artificial Intelligence (AAAI-99); Proceedings of the 11th Conference on Innovative Applications of Artificial Intelligence* (Orlando, Fla.), pages 80–85, AAAI/MIT Press, July 1999, incorporated herein by reference in its entirety, dynamically categorizes search results into a hierarchical organization using a model of the domain terminology.

Another approach to document categorization is "content ignorant." For example, Doug Beeferman and Adam Berger in Agglomerative Clustering of a Search Engine Query Log, *Proceedings of the 2000 Conference on Knowledge Discovery and Data Mining* ( Boston, Mass.), pages 407–416, August 2000, incorporated herein by reference in its entirety, uses click-through data to discover disjoint sets of similar queries and disjoint sets of similar URLs. Their algorithm represents each query and URL as a node in a graph and creates edges representing the user action of selecting a specified URL in response to a given query. Nodes are then merged in an iterative fashion until some termination condition is reached. This algorithm forces a hard clustering of queries and URLs. This algorithm works on large sets of data in batch mode, and does not include prior labeled data from existing content hierarchies. By focusing on click-through statistics, these authors only see an abbreviated portion of a user's activities while searching. This paper also only advocates improving web search by proposing for users alternative queries taken from the disjoint sets of queries built by their algorithm.

Approaches to hierarchical classification such as that discussed by Ke Wang, Senqiang Zhou, and Shiang Chen Liew in Building Hierarchical Classifiers Using Class Proximity, *Proceedings of the Twenty-fifth International Conference on Very Large Databases* (Edinburgh, Scotland, UK), pages 363–374, September 1999, incorporated herein by reference in its entirety, when applied to our data, would only allow for one URL to be related with each query.

Most recent work in Web searching has been to improve the search engine ranking algorithms. For example, PageRank, by Sergey Brin and Lawrence Page, in The Anatomy of a Large-Scale Hypertextual Web Search Engine, *Proceedings of the Seventh International World Wide Web Conference* (*WWW7*) (Brisbane, Australia), Elsevier Science, April 1998, incorporated herein by reference in its entirety, The WISE System by Budi Yuwono and Dik Lun Lee, in WISE: A World Wide Web Resource Database System, *IEEE Transactions on Knowledge and Data Engineering*, 8(4):5:48–554, August 1996, incorporated herein by reference in its entirety, Budi Yuwono and Dik L. Lee, in Server Ranking for Distributed Text Retrieval Systems on the Internet, *Proceedings of the 5th International Conference on Database Systems for Advanced Applications* (*DASFAA '97*) (Melbourne, Australia), pages 41–49, April 1997, incorporated herein by reference in its entirety, and NECI's metasearch engine, by Steve Lawrence and C. Lee Giles, in Inquirus, the NECI Meta Search Engine, *Proceedings of the Seventh International World Wide Web Conference* (*WWW7*) (Brisbane, Australia), pages 95–105, Elsevier Science, April 1998, incorporated herein by reference in its entirety, are examples of such work. Direct Hit (www.directhit.com) claims to track which Web sites a searcher selects from the list provided by a search engine, how much time she spends on those sites, and takes into account the position of that site relative to other sites on the list provided. Thus, for future queries, the most popular and relevant sites are notated in the search engine results.

WebWatcher attempts to serve as a tour guide to Web neighborhoods, see Webwatcher: A Learning Apprentice for the World Wide Web by Robert Armstrong, Dayne Freitag, Thorsten Joachims, and Tom Mitchell in *Proceedings of the 1995 AAAI Spring Symposium on Information Gathering From Heterogeneous, Distributed Environments* (Palo Alto, Calif.), pages 6–12, March 1995, incorporated herein by reference in its entirety, and Webwatcher: A Tour Guide for the World Wide Web by Thorsten Joachims, Dayne Freitag, and Tom M. Mitchell in *Proceedings of 15th International Joint Conference on Artificial Intelligence* (*IJCAI97*) (Nagoya, Japan), pages 770–777, Morgan Kaufmann, August 1997, incorporated herein by reference in its entirety. Users invoke WebWatcher by following a link to the WebWatcher server, then continue browsing as WebWatcher accompanies them, providing advice along the way on which link to follow next based on a stated user goal. WebWatcher gains expertise by analyzing user actions, statements of interest, and the set of pages visited by users. Their studies suggested that WebWatcher could achieve close to the human level of performance on the problem of predicting which link a user will follow given a page and a statement of interest.

Marko Balabanovic and Yoav Shoham in Fab: Content-Based, Collaborative Recommendation, *Communications of the ACM*, 40(3):66–72, March 1997, incorporated herein by reference in its entirety, discusses Rab, a Web recommendation system; this system is not designed to assist in Web searching, and it requires users to rate Web pates. WebGlimpse described by Udi Manber, Mike Smith, and Burra Gopal in WebGlimpse: Combining Browsing and Searching, *Proceedings of the 1997 USENIX Annual Technical Conference* (Anaheim, Calif.), pages 195–206, January 1997, incorporated herein by reference in its entirety, restricts Web searches to a neighborhood of similar pages, perhaps searching with additional keywords in the neighborhood. It saves one from building site-specific search engines.

Clever, described by Soumen Chakrabarti, Byron Dom, Prabhakar Raghavan, Sridhar Rajagopalan, David Gibson, and Jon Kleinberg in Automatic Resource Compilation by Analyzing Hyperlink Structure and Associated Text, *Proceedings of the Seventh International World Wide Web Conference* (*WWW7*) (Brisbane, Australia), Elsevier Science, April 1998, incorporated herein by reference in its entirety, and D. Gibson, J. Kleinberg, and P. Raghavan in Inferring Web Communities from Link Topologies, *Proceedings of the 9th ACM Conference on Hypertext and Hypermedia: Links, Objects, Time and Space—Structure in Hypermedia Systems* (Pittsburgh, Pa.), pages 225–234, June 1998, incorporated herein by reference in its entirety, builds on the HITS (Hypertext-Induced Topic Search) algorithm, which seeks to find authoritative sources of information on the Web, together with sites (hubs) featuring good compilations of such authoritative sources. The original HITS algorithm first uses a standard text search engine to gather a "root set" of pages matching the query subject. Next, it adds to the pool all pages pointing to or pointed to by the root set. Thereafter, it uses only the links between these pages to distill the best authorities and hubs. The key insight is that these links capture the annotative power (and effort) of millions of individuals independently building Web pages. Clever additionally uses the content of the Web pages. SALSA described by R. Lempel and S. Moran in The Stochastic Approach for Link-Structure Analysis (SALSA) and the TKC Effect, *Proceedings of the Ninth International World Wide Web Conference* (*WWW9*) (Amsterdam, Netherlands), May 2000, incorporated herein by reference in its entirety, presents another method to find hubs and authorities.

Paul P. Maglio and Rob Barrett, in How to Build Modeling Agents to Support Web Searchers, *Proceedings of the Sixth International Conference on User Modeling* (*UM97*) (Sardinia, Italy), Springer Wien, N.Y., June 1997, incorporated herein by reference in its entirety, studied how people search for information on the Web. They formalized the concept of waypoints, key nodes that lead users to their searching goal. To support the searching behavior they observed, Maglio and Barrett constructed a Web agent to help identify the waypoint based on a user's searching history. Unfortunately, it is not clear how to extend the waypoint URL so that other users can profit from it.

All of this work is motivated, at least in part, by a general need to improve database and Internet searching in general. However, a large part of the motivation to improve Web searching is brought about by the advent of mobile computing and communication devices and services. For example, cell phone and personal digital assistant (PDA) users are demanding Internet connectivity. One of the fundamental design challenges of today's mobile devices is the constraints of their small displays. For example, PDAs may have a display space of 160×160 pixels, while a cellular phone can be limited to only five lines of 14 characters each. Differences in display real estate and access to peripherals like keyboards and mice can alter the user experience with much of the content available on the Web. These display limitations as well as bandwidth limitations related to constraints of mobile communication are accommodated through special connectivity services.

Considering the interface constraints in the mobile environment, one can easily see how important proper selection of content becomes in mobile Web searching applications. Without the benefit of refining content selection, delivery, and distribution, a user may be inundated with search results, and may be unable to manipulate the content in a manner satisfactory to the task, context, or application at hand. As such, it would be desirable to have an improved search system for general Internet and database applications, but also for tailoring search results for display on a limited browser screen.

Of the available methods to improve search results, there are several techniques that are commonly used:

Improved ranking algorithms. Current search engines crawl the Web and build indexes on the keywords that they deem are important. The keywords are used to identify which URLs should be displayed. A great deal of work had been done to improve the ranking of the URLs. For example, see the work of Brin and Page mentioned above.

Meta-search engines. A meta-search engine queries a group of popular engines, hoping that the combined results will be more useful than the results from any one engine. For example, MetaCrawler collates results, eliminates duplication, and displays the results with aggregate scores (see The MetaCrawler Architecture for Resource Aggregation on the Web, *IEEE Expert,* 12(12):8–14, January/February 1997, by Erik Selberg and Oren Etzioni, incorporated herein by reference in its entirety).

Dedicated search engines. There exist a number of search engines specializing in particular topics.

Specialized directories. Yahoo, About, LookSmart, and DMOZ organize pages into topic directories. These special hierarchies are maintained by one or more editors, and hence their coverage is somewhat limited and their quality can vary. These directory structures are also referred to as resource lists or catalogs.

Bookmarks. Individuals often keep a set of bookmarks of frequently visited pages and share their bookmark files with others interested in the same topics, e.g. www.backflip.com.

With reference to the two last techniques, members of a community (office, work group, or social organization) often think about, and research, the same set of topics. When searching for information on the Web, if others from one's community have recently performed the same searches, it would be helpful to know what they found; search results could then feed into a shared pool of knowledge. To be practically useful, this pool needs to be maintained without requiring direct input from the members of the community.

However, gathering such a pool is only useful if queries are repeated. In examining 17 months of proxy server logs at Bell Labs, 20% of the queries sent to search engines had been done before. Based on this promising number, Search-Light, a system disclosed in U.S. patent application Ser. No. 09/428,031, filed Oct. 27, 1999, entitled Method for Improving Web Searching Performance by Using Community-Based Filtering by Shriver and Small, which is incorporated herein by reference in its entirety, was built, which transparently constructs a database of search engine queries and a subset of the URLs visited in response to those queries. Then, when a user views the results of a query from a search engine, SearchLight augments the results with URLs from the database. Experimental results indicate that among all the cases when a search involves a query contained in the SearchLight database, the desired URL is among those in the SearchLight display 64% of the time.

Unfortunately, if the SearchLight database is large, it will have many of the same problems experienced by other search engines—too many results to display with the order being the only technique to help the user.

There is a desire to provide a scalable method to improve or augment available data searching techniques.

BRIEF SUMMARY OF THE INVENTION

Therefore, a method of improving search of a database has been developed. The method comprises, monitoring user search activity in a user population, extracting search sessions, defined by search queries and paths, from user search activity, determining groups of semantically related queries or paths based on search session data, determining probabilities that records in the database are relevant for each query or path group, maintaining a table associating an index for each record in the database with the probability that the record is relevant for each query or path group, and, supplementing search results with information regarding records from the database with tabulated relevance probabilities.

In some embodiments, monitoring user search activity in a user population and extracting search sessions from user search activity includes off-line processing of proxy server access logs to determine search sessions (where off-line refers to a batch style processing in which data are handled at regular intervals e.g. once a day).

In some embodiments, monitoring user search activity in a user population and extracting search sessions from user search activity includes on-line processing in a proxy server to determine search sessions (where online refers to an event driven style of processing in which data are handled each time a search session ends).

In some of these embodiments determining search sessions includes determining complete search sessions. For example, a search session is determined to include all the web pages visited while performing the searching task, including, for example, not only the Web pages presented in a search engine results page, but also including pages explored as a result of viewing pages listed on the search engine results page.

BRIEF DESCRIPTION OF THE SEVERAL VIEWS OF THE DRAWINGS

The invention may take form in various components and arrangements of components, and in various procedures and arrangements of procedures. The drawings are only for purposes of illustrating preferred embodiments, they are not to scale, and are not to be construed as limiting the invention.

DETAILED DESCRIPTION OF THE INVENTION

We consider enhancing the standard search facility associated with a database. Users initiate searches by submitting queries to the search facility, where each query consists of one or more search terms. The present invention is based on the idea that semantically related search terms (even if they do not include any of the same words) lead users to access similar records in a database while they are searching. By combining the complete search activities from a large community of users, search terms can be grouped through clustering or grouping. Then, for each group, the most relevant records are identified, again using the data collected from user activities. When a user submits a query to a search engine, the present invention, which is termed Hyponym, decides to which group or groups the search term belongs, and then displays indices for the most relevant records stratified by the identified query groups.

More particularly, the method consists of the following steps: 1) User activities are passively monitored as they access the standard search facility of a database. Users submit queries to the search facility, where each query consists of one or more search terms. 2) We summarize the sequence of user activities during a searching task into a structure called a search session. Technically, a search session consists of a user's search terms and the indices of the records they accessed in the database while searching. 3) We maintain a table of the number of times each record was accessed in response to each search term issued by a community of users. Every time a user conducts a search, we increment the appropriate elements in this table based on the associated search session. A search session may also include a timestamp. 4) Recognizing that semantically related search terms lead users to access many of the same records, we use this table to form groups or clusters of search terms, known as query groups based on the patterns of accesses recorded by the search sessions. With some kinds of clustering, a search term may belong to several groups and a numerical score is used to describe the strength of association. 5) Then, again using the tabulated search session data, we estimate the chance that each record in the database is relevant for the different query groups. (It is possible to also use the tabulated data to introduce groups of URLs as well. In this case we would estimate the probability that a group of URLs is relevant for a group of queries.) The resulting numerical scores are called relevance weights. Either of steps (4) and (5) can be updated every time a user completes a search, a method known as on-line processing; or they can be done periodically, processing a number of search sessions in a batch i.e. as in off-line processing. 6) When a new search is initiated we identify the group or groups with which the user's search term it is most strongly associated and return a list of the indices to the most relevant records in the database, stratified by query group.

In some embodiments, the query groups are computed via a mixture model. This kind of clustering will typically involve computing association weights (relating search terms to clusters) and relevance weights (relating database records to query groups) via the well-known expectation-maximization (EM) algorithm.

In some embodiments of the method, the clustering can be aided by information in existing structures that provide organization to the database. This might include a tree structure that associates records in the database with a hierarchically specified set of topics. We refer to information of this kind as labeled data because it directly associates database records with broad topics. In some embodiments of the method, when a mixture model is employed, this labeled data can be used via a simple approximate EM scheme.

An embodiment directed toward improving Web search specializes the database to the collection of pages available on one or more Web sites, and takes the standard search facility to be an existing search engine. In this context, the labeled data to help form query clusters and relevance weights could consist of an existing content hierarchy (like www.yahoo.com or www.about.com).

In situations where either the content in a database or the terms being searched for by the community of users continually changes, the methods for integrating new search session data should function in near realtime. This necessitates an on-line mechanism for learning query groups and relevance weights. When this clustering involves a mixture model, an on-line variant of the EM algorithm can be employed.

Information about users as they search is distilled into an object known as a search session, the pairing of a user' search term and the records they accessed while searching e.g. the query and complete path. The present invention relies on two assumptions: (1) Search sessions can be obtained; and (2) the information contained in a collection of search sessions can be used to assist in searching "in the future." In one embodiment of the invention, the World Wide Web is searched by users for HTML documents relating to a given search term. Viewing the World Wide Web as a database, the separate records or Web pages are indexed by their URLs. For Web searching, a user's search session consists of their search terms and URLs of all the HTML pages they visited in response to their query. Several options are available for monitoring user activities on the World Wide Web. In one embodiment, we have made use of proxy server logs. A proxy server is a computer that connects a community of users to the public Internet. It accesses content on behalf of this community. Requests for HTML pages and other items are directed to the proxy server, which in turn establishes a connection with the appropriate host on the Internet and retrieves the desired item. It then delivers the item to the user who issued the request. As part of this process of serving content, proxy servers record the URLs of the items requested by their users. From this large log file, the search sessions for every person using the particular proxy server. A search session extractor takes as input proxy server logs, and outputs queries and ordered sets of URLs visited for those queries and timestamps for these events.

While the disclosed methods can be applied generally to database searches, we provide extra detail concerning an exemplary embodiment involving search session extraction from proxy server logs.

Search Session Extraction Example: Proxy Server Logs

As noted above, a proxy server handles all the requests made by a user community and hence records a wealth of information about user behaviors. With these data, access to the complete path a user follows while searching is available. Given a proxy server log, we can extract search sessions in one of two ways. First, we can "replay" that part of a user's actions that are directly associated with a search task (i.e., re-retrieving the pages a user requested) to determine the path the user followed. This scheme is referred to as an off-line collection scheme. Alternatively, we can avoid the overhead of replaying requests by instead modifying a proxy to directly log the information needed to determine search sessions, or to have a background daemon processing the Web pages while they are still in the file system cache. We refer to this setup as an on-line collection scheme.

In the context of searching the World Wide Web for HTML pages, search sessions consist a query posted to a search engine together with the URLs of HTML pages the user accesses in response to the query. Recall that a proxy will record all the items requested by a user, which includes the embedded URLs (such as image files) on each HTML page they view that are fetched automatically by the browser. Therefore, for the purpose of enhancing Web search for HTML pages, we exclude these other URLs from a search session, and throughout the rest of this disclosure, take "URL" to mean an HTML URL. (However, the methods disclosed here are clearly extendable to other file and data types.)

As will be clear to those of ordinary skill in the art, finding the beginning of a search session from a proxy server log is trivial: a session begins when a user submits a query to a known search engine like www.google.com. In terms of the proxy server log file, this event is associated with a string of the form "http://www.google.com/search?hl=en&q=query", where "query" is another string consisting of one or more search terms. For example, a search for "network statistics" will generate the string http://www.google.comsearch?hl=en&q=network+statistics in the proxy server log. A table of rules for how to extract the search terms from each (popular) known search engine (say, www.lycos.com, www.google.com, and search.yahoo.com among others) is easily maintained. It is more difficult to determine, using only proxy server logs, when a search session ends. In order to do so, the following assumptions are made: (1) Once a user submits a search query, as long as the user visits pages that are referenced, directly or indirectly through a link, by the results of the search query, the search session has not ended. This is not true when the user types in a URL that is also in the currently displayed page; this case is rare. (2) A search session ends if it is inactive for more than an hour. Inactivity is determined using the timestamp of the last URL added to the search session. (3) The user can perform a side task using their browser, and then return to the original searching task. The first URL in the side task is a transitional URL. Finally, a technical condition is required in settings where users aggressively "multi-task": (4) The user does not have more than 10 search sessions active at any one time.

A completed search session is one where a user visits at least one URL. The user could view the search engine results and decide not to visit any links, resulting in an incomplete search session.

Figure 1:
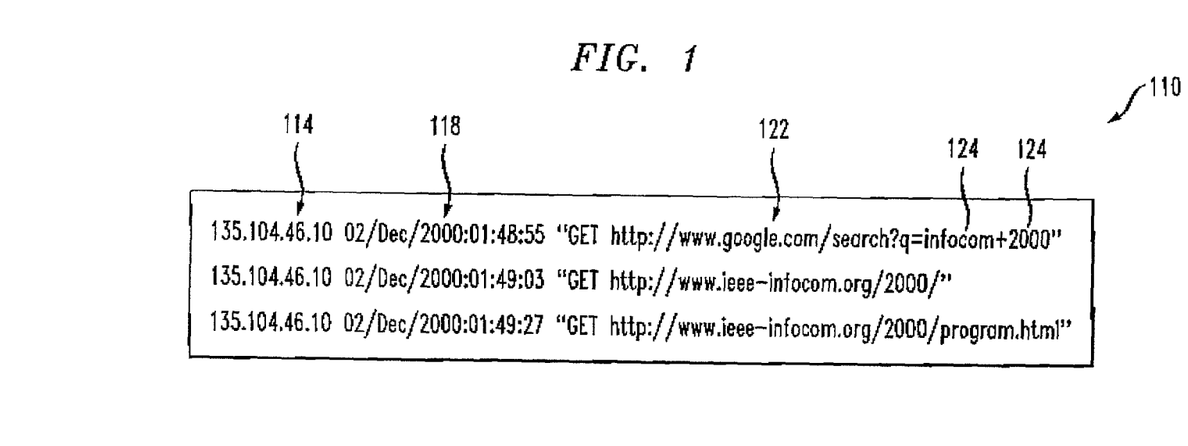
FIG. 1 is a portion of an exemplary proxy server log corresponding to a search session.
Figure 2:
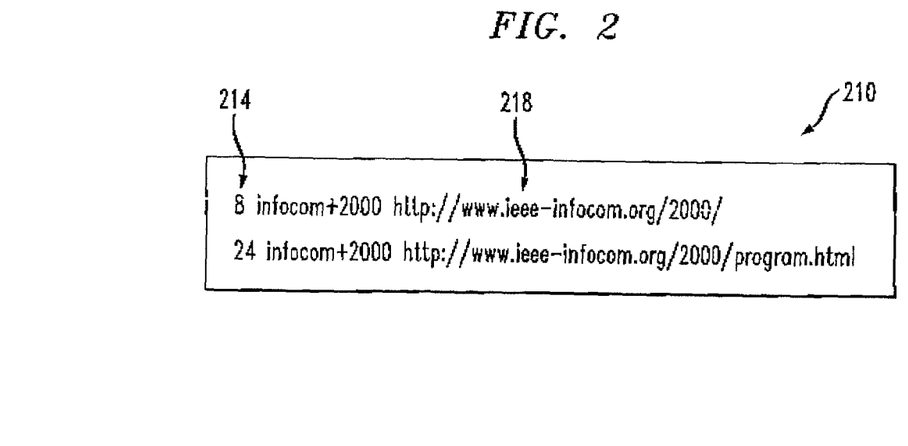
FIG. 2 represents data related to a search session that was extracted from the proxy server log of FIG. 1.

FIG. 1 contains a subset 110 of the fields available in an exemplary proxy log corresponding to a search session. Many of the fields are not needed for the search session extractor, and thus are not shown. For example, the proxy log subset includes an IP (Internet protocol) address 114 associated with a proxy user, a time stamp 118 associated with the logged event, a URL 122 associated with a target Web page. Where the event is a search engine search the URL can includes search terms 124. FIG. 2 lists the resulting search session 210 with timestamps 214. There are many complications that need to be addressed when extracting a search session, such as, for example, handling multiple concurrent searches from the same user on similar topics. Details of the search session extractor are described by Elizabeth Shriver and Mark Hansen in Search Session Extraction: A User Model of Searching. Bell Labs Technical Report, January 2002, incorporated herein by reference in its entirety.

A refinement of a query occurs when the user modifies the query or decides to use a different search engine. For example, the user's first query might be "high blood pressure", the second query could be "high blood pressure causes", and the third could be "hypertension".

Since the search terms could completely change during a refinement, it was determined that a query is an element in a refinement by the amount of time between two consecutive queries from a user. For example, if the amount of time is short (e.g. less than 10 minutes), the queries are assumed to be related. This heuristic was verified (by eye) for a month worth of queries and found to be sufficient. A more sophisticated approach involves modeling the time between the initiation of search sessions, and deriving user-specific time constants. A query that is not refined is a simple query. Queries that are refinements are grouped into topic sessions.

Class of Algorithms

The search session data 210 contain the URLs 218 visited during user searches. From this information, many things can be determined. For example, how long a user visited a page, which page was visited first, which page was visited the most across search sessions for a specific query, and other information can be extracted from the session data 210. Thus, a class of algorithms is defined which manipulate search and topic sessions to improve Web search. Two examples from this class, SearchLight and Hyponym, will be discussed below. The general form of input into this class is (t,q,u), u is a URL selected from the group of URLs formed by the transitive closure of the search engine results for query q. The timestamp t is the difference in time between the current event and the previous. In the general form of output from the algorithm, each query $q_i$ is associated with one or more query groups, each URL $u_j$ is associated with one or more URL groups, and each query group $Q_k$ is associated with one or more URL groups $U_l$. A first relation is captured by the triple $(q_i, Q_k, w^q_{ik})$, where $w^q_{ik}$ is the probability that $q_i$ belongs to group $Q_k$. A second relation is captured by the triple $(u_j, U_l, w^u_{jl})$, where $w^u_{jl}$ is the probability that $u_j$ belongs to group $U_l$. A third relation is represented by $(Q_k, U_l, w_{kl})$ where $w_{kl}$ is the probability that $Q_k$ and $U_l$ are related. That is, with probability $w_{kl}$, the urls in $U_l$ contain information about the queries in $Q_k$.

Practically, the triples are put in a table (often another database) which is then queried when a user performs a search. Clearly, the table can be placed at any point in the Web path that recognizes that the user is performing a query; possible spots are at the browser, in a proxy server if one is used, and at a search engine server.

We now briefly present a simple element of the class known as SearchLight. SearchLight uses a table of query and target URL pairs (q,u) pairs, but does not involve any kind of clustering. The present invention, Hyponym, is best explained as an extension of SearchLight.

SearchLight

SearchLight begins with a table that records the number of times each query and target URL pair (q,u) occurs among a collection of search sessions. Somewhat heuristically, the target URL for a search session is defined to be the last page that the user visits before they move to a new task. Other possible definitions include the URL that the search stays on for the longest amount of time and the first 5 URLs that the searcher visits.

The table is used to find and display URLs related to a query input by a user. For example, with reference to FIG. 3, SearchLight displays the URLs 314 by weight 318. (FIG. 3 assumes that SearchLight is implemented in a proxy; if it were implemented in a search engine, the window would have only the lower frame.)

SearchLight is triggered into action when a user enters a search string or query into a search engine. If necessary, SearchLight first modifies the query by converting it to lower case, removing punctuation, and sorting the terms alphabetically. If there are no table entries for the modified query, SearchLight considers intersecting sets of the search terms. This ensures that the application provides URLs even if the query is only a close approximation to those in the table. So, if a search for "cryptosystem mceliece" does not have any exact matches in the table, URLs would be returned from queries such as "mceliece", "cryptosystem", and even "robert mceliece".

Figure 3:
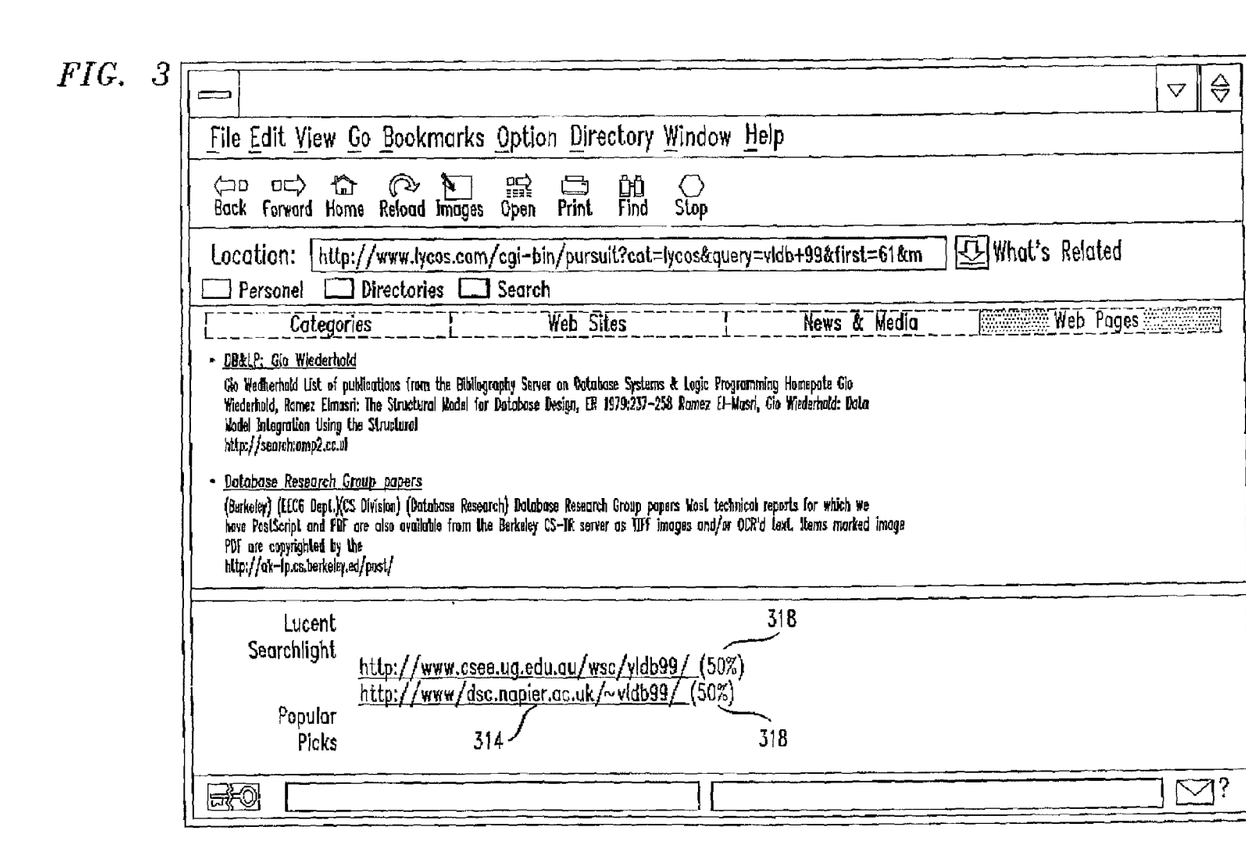
FIG. 3 is an exemplary browser window illustrating a first search results augmentation scheme.

Another search efficiency enhancing feature is an algorithm that replaces and/or expands abbreviations from the browser's search string and retrieves results for the matching abbreviated term. To determine the common abbreviations, for each URL logged in our exemplary proxy log, a list of all queries in which the URL was the last URL selected was generated. The lists of queries were examined that represented the most frequent URLs and added processing in a table lookup routine for the 12 most common ones. For example, "NY" is replaced by "New York," and "airlines" (and vice versa). Of course, other kinds of enhancements can be added. For example, cases of equating words with their plurals could be done by a word stemmer. The URL 314 list is sorted so that the most frequently accessed page is displayed first. As the number of URLs increase for queries, the URLs with low counts are moved off of the list that is displayed to the user. Thus, old URLs are displaced with newer URLs.

Hyponym

Aside from post-processing that enlarges or reduces search terms, SearchLight relies on an exact match to make recommendations. In studying the SearchLight table, it can be found that search terms that are semantically related often lead users to the same collection of URLs. Therefore, groups of queries are formed based on the similarity of their associated search sessions. In turn, by combining search sessions with queries in a given group, the relevance of the URLs recommended is improved. This is the basic idea behind Hyponym. When a user initiates a new search, they are presented with a display of query groups related to the search terms and the most relevant URLs for each group.

The present invention includes algorithms for both forming the query groups as well as determining the most relevant URLs for each group. The present invention, or Hyponym, constructs a statistical mixture model to describe the data contained in a table, e.g. the SearchLight table. This model has as its parameters the probability that a given query belongs to a particular group as well as a set of group-specific relevance weights assigned to collections of URLs. The algorithms attempt to fit the same model to the data. Some embodiments of Hyponym employ a standard EM (Expectation-Maximization) algorithm. However, this technique has problems related to scaling (both in the number of search sessions as well as the number of groups needed to obtain a reasonable fit) and therefore has disadvantages. Other embodiments of Hyponym use a relatively less computationally expensive scheme that is referred to as approximate EM. The approximate EM technique usually arrives at a different fit than the standard EM, however there is typically little practical difference between the two. Finally, given the dynamic character of many databases (like the collection of pages on the Web) we will also introduce an embodiment of Hyponym that includes online variants of the EM algorithm that allow us to process search sessions in realtime.

The Hyponym Idea

Given the description above, each query $q_i$ is associated with one or more groups. This relation is captured by the triple $(q_i, k, w_{ik})$, where k denotes a group ID and $w_{ik}$ is the probability that $q_i$ belongs to group k. Then, for each group, a number of relevant URLs are identified. This is described by the triple $(k, u_j, \lambda_{kj})$ where $u_j$ is a URL and $\lambda_{kj}$ is a weight that determines how likely it is that $u_j$ is associated with the queries belonging to group k. These triples are stored in a table that Hyponym uses. An example of a query-group triple $(q_i, k, w_{ik})$ might look like, (infocom+2000,304,0.9)

while the associate group-relevance triples $(k, u_j, \lambda_{kj})$ might be (304,http://www.ieee-infocom.org/2000/,0.5)

(304,http://www.ieee-infocom.org/2000/program.html, 0.5)

As mentioned above, sets of such triples constitute the parameters in a statistical model for the search sessions contained in a table, similar to that described in reference to SearchLight.

A mixture model is employed to form both the query groups as well as the relevance weights. Assume that a dataset has I queries that we would like to assign to K groups, and in turn determine group-specific relevance weights for each of J URLs. For the moment, let $n_{ij}$ denote the number of times the URL $u_j$ was selected by some user during a search session under the query $q_i$. Let $n_i = (n_{i1}, \ldots, n_{ij})$ denote the vector of counts associated with query $q_i$. This vector is modeled as coming from a mixture of the form $$\alpha_1 p(n_i|\lambda_1) + \ldots + \alpha_K p(n_i|\lambda_K), \quad (1)$$

where the terms $\alpha_k$ sum to one and denote the proportion of the population coming from the kth component. Also associated with the kth component in the mixture is a vector of parameters $\lambda_k$. From a sampling perspective, one can consider the entire dataset $n_i$, $i=1, \ldots, I$, as being generated in two steps: first, one of the K groups $k^*$ is selected according to the probabilities $\alpha_k$ and then the associated distribution $p(\cdot|\lambda_k^*)$ is used to generate the vector $n_i$.

The specification of each component in the mixture (1) is considered. It is assumed that in the kth component, the data $n_{ij}$ come from a Poisson distribution with mean $\lambda_{kj}$, where the counts for each different URL $u_j$ are independent. Then, setting $\lambda_k = (\lambda_{k1}, \ldots, \lambda_{kj})$, the likelihood of the kth component associated with a vector of counts $n_i$ is given by $$p(n_i | \lambda_k) = \prod_j \frac{e^{-\lambda_{kj}} \lambda_{kj}^{n_{ij}}}{n_{ij}!} \quad (2)$$

To fit a model of this type, a set of unobserved (or missing) indicator variables $\gamma_{ik}$, are introduced where $\gamma_{ki}=1$ if $q_i$ is in group k, and zero otherwise. Then, the so-called complete data likelihood for both the set of counts $n_i$ and the indicator variables $\gamma_i = (\gamma_{i1}, \ldots, \gamma_{iK})$, $i=1, \ldots, I$, can be expressed as $$\prod_i \prod_k \left[ \alpha_k \prod_j \frac{e^{-\lambda_{kj}} \lambda_{kj}^{n_{ij}}}{n_{ij}!} \right]^{\gamma_{ik}} \quad (3)$$

The parameters $\lambda_{kj}$ are referred to as relevance weights, and the probability that $\gamma_{ik}=1$ is used as the kth group weight for query $q_i$ (the $w_{ik}$ mentioned at the beginning of this section).

A number of different algorithms fit this model and, in turn, perform a clustering. They are presented below.

Figure 4:
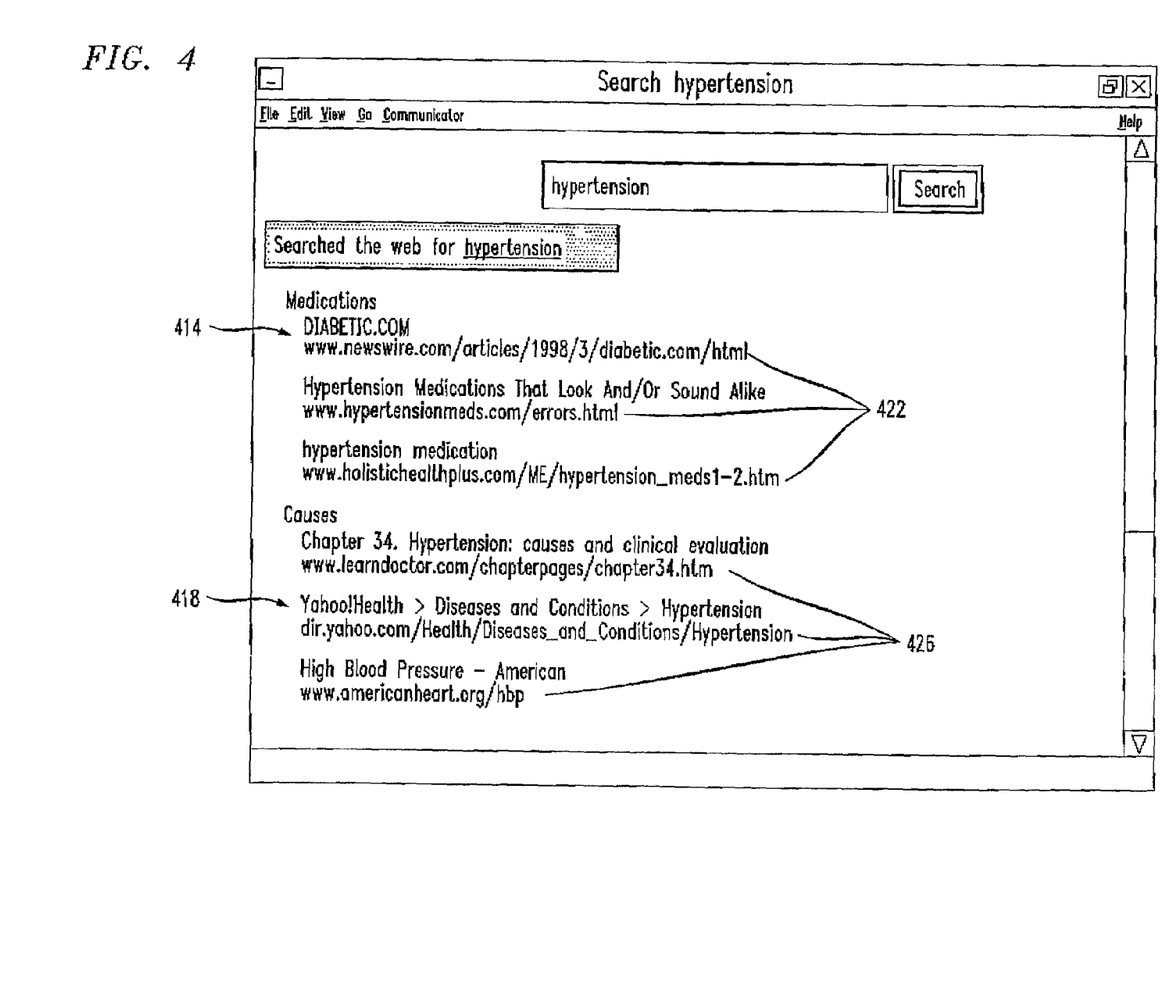
FIG. 4 is an exemplary browser window illustrating a second search results augmentation scheme.

The table is used to display URLs related to the query searched by the user. Referring to FIG. 4, the query groups 414, 418 are displayed by weight, with the URLs 422, 426 in each group ordered by weight.

Standard EM Algorithm

As explained by A. P. Dempster, N. M. Laird, and D. B. Rubin, in Maximum Likelihood for Incomplete Data Via the EM Algorithm (with discussion), *Journal of the Royal Statistical Society (Series B)*, 39:1–38, 1977, incorporated herein by reference in its entirety, the standard Expectation-Maximization (EM) algorithm is a convenient statistical tool for finding maximum likelihood estimates of the parameters in a mixture model.

The EM algorithm alternates between two steps; an E-step in which we compute the expectation of the complete data log-likelihood conditional is computed on the observed data and the current parameter estimates, and an M-step in which the parameters maximizing the expected log-likelihood from the E-step are found. The E-step consists of calculating the conditional expectation of the indicator variables $\gamma_{ik}$, which are denoted:

$$\hat{\gamma}_{ik} = \frac{\hat{\alpha}_k p(n_{ij} \mid \hat{\lambda}_k)}{\sum_l \hat{\alpha}_l p(n_{ij} \mid \hat{\lambda}_l)}, \quad (4)$$

where $p(\cdot \mid \hat{\lambda}_k)$ is given in (2). In this expression, the quantities $\hat{\alpha}_k$ and $\hat{\lambda}_k$ denote our current parameter estimates. Note that $\hat{\gamma}_{ik}$ is an estimate of the probability that query $q_i$ belongs to group k, and will be taken to be our query group weights. Then, for the M-step, $\hat{\gamma}_{ik}$ is substituted for $\gamma_{ik}$ in (3), and maximized with respect to the parameters $\alpha_k$ and $\lambda_k$. In this case, a closed form expression is available, giving the updates $$\hat{\alpha} = \frac{\sum_i \hat{\gamma}_{ik}}{\sum_l \sum_i \hat{\gamma}_{il}}, \text{ and } \hat{\lambda}_{kj} = \frac{\sum_i n_{ij} \hat{\gamma}_{ik}}{\sum_i \hat{\gamma}_{ik}} \quad (5)$$

Clearly, these simple updates make the EM algorithm a convenient tool for determining query group weights and relevance weights. Unfortunately, the convergence of this algorithm can be slow and will often converge to only a local maximum. To obtain a good solution, we start the EM process from several random initial conditions and take the best of the converged fits.

Approximate Algorithm with Prior Data

Figure 5:
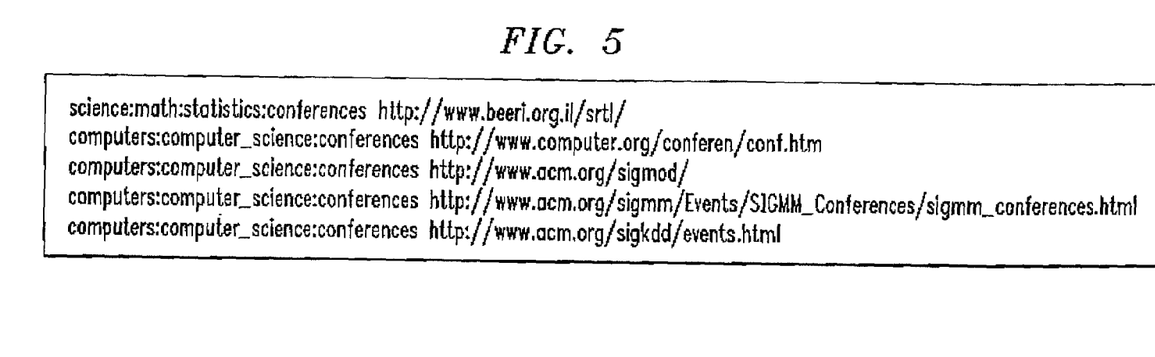
FIG. 5 is a portion of an exemplary set of predetermined directory or labeled data.

In moving from the original SearchLight to the Hyponym embodiments, the query groups formed by the mixture model introduced above allows the borrowing of strength from search sessions initiated with different but semantically related search terms. The mixture approach, however, is highly unstructured in the sense that only user data is incorporated to learn the groups and relevance weights. Having taken a probabilistic approach to grouping, prior information about related URLs is incorporated from, an existing directory like DMOZ (www.dmoz.com) or Yahoo. These directories constitute predetermined directories and included labeled data. For example, consider the 30,000 categories identified by DMOZ. (FIG. 5 contains a subset of the fields for a few sample DMOZ entries.) Embodiments of Hyponym that are based on the approximate EM algorithms use a directory structure or labeled data to seed query groups. The data in such a structure can be represented as a set of pairs (l, $u_{lj}$) is a URL in the lth group. The probability $w^u_{jl}$ is not specified in the directory so it is assumed it has a value of $\alpha$.

With this algorithm, as illustrated in the pseudo code below, mappings between queries and URLs are established when either the query or the URL has been seen in either the prior data (from a proxy log) or the sessions that have already been processed.

readPriorData
for each session s
  if (query in s was NOT seen before) and
    (# URLs existed/# URLs in s<T)
      put s aside to be processed using BasicEM algorithm
  else
    createURLGroup if needed
    add mappings between query and URL groups
    output mappings The remaining sessions are processed in a batch using the standard EM algorithm described above. The approximate algorithm can be tuned with the threshold value T ($0 \leq T \leq 1$) to force more of the URLs in the session to exist in the prior data or the previously processed data. The approximate EM algorithm supports processing data as search sessions or topic sessions.

The approximate EM algorithm has the advantage of incorporating prior or predetermined data, but has the disadvantage of only slowly adding to the set of clusters when a new topic is found in the data.

On-line EM Algorithm with Labeled Data

Using the probabilistic mixture model of the data, a more formal on-line algorithm can take a directory structure as input and learn the query clusters. The on-line EM algorithm presented in On-Line EM Algorithm for the Normalized Gaussian Network by Masa-aki Sato and Shin Ishii presented in *Neutral Computation*, 12(2):407–432, February 2000, incorporated herein by reference in its entirety, is used to process data arriving in a stream of search sessions. To understand this approach, consider the E-step given in (4) and the M-step in (5). Because the Poisson model is part of an exponential family, these updates should be considered in terms of the sufficient statistics for the complete data model (3). Then, the E-Step computes $$S_k = \sum_i \hat{\gamma}_{ik} \text{ and } T_{jk} = \sum_i n_{ij} \hat{\gamma}_{ik}, \quad (6)$$

where the updated probabilities are given in (4). In the on-line approach, the sums over the queries i are replaced with a weighted version indexed by time. Let $q_t$, $u_t$, $n_t$ represent a search session initiated at time t, and let $u_t = (u_{t,l}, \ldots, u_t, J_t)$ denote the URLs visited and $n_t = (n_{t,l}, \ldots, n_t, J_t)$ their frequency within the session. Then, an on-line version of (6) resembles $$S_k(t) = (1-\eta(t))S_k(t-1) + \eta(t)\gamma^*_k$$

and $$T_{j_{t,l}k}(t) = (1-\eta(t))j_{t,l}k(t-1) + \eta(t)\gamma^*_k n_{t,l} \text{ for } l=1, \ldots, J_t$$

where $j_{t,l}$, $l=1, \ldots, J_t$, represents an index for URL $u_{t,l}$. In these expressions, $$\hat{\gamma}_k^* = \frac{\hat{a}_k \prod_j p(n_{t,j} | \hat{\lambda}_{jk}(t))}{\sum_l \hat{a}_l \prod_j p(n_{t,j} | \hat{\lambda}_{jl}(t))}, \qquad (7)$$

and $$\hat{\lambda}_{jt,k}(t) = T_{jt,k}(t) / S_k(t), l = 1, \ldots, J_t.$$

The term $0<\eta(t)<1$ used to control the learning rate. Technically, given a long stream of data, the rate should be reduced as more data is seen. Given the sparse nature of the search session data, a constant learning rate is found to perform adequately. Additionally, Sato and Ishii have shown that for a fixed number of clusters, this approach provides a stochastic approximation to the maximum likelihood estimators for query group membership and the relevance weights. Given the large number of clusters in a directory like DMOZ, it is impractical to do a full M-step at each time point. Instead, we choose to only take a partial M-step and update just those relevance weights with indices contained in the incoming search session ($q_t$, $u_t$, $n_t$). This kind of alteration is well known (for example, see A View of the EM Algorithm that Justifies Incremental, Sparse, and other Variants by Radford M. Neal and Geoffrey E. Hinton in *Learning in Graphical Models*, pages 355–368, Kluwer Academic Publishers, 1998, incorporated herein by reference in its entirety) and in the basic EM algorithm does not effect convergence.

To incorporate the labeled data, a set of clusters is initiated so that each URL $u_{lj}$ in the lth group of the existing hierarchy is assigned some fixed value $\lambda_{lj}$. Then, when a new search session ($q_t$, $u_t$, $n_t$) arrives, (7) is evaluated to see how well it fits with the existing groups. If the probability is too small, we initiate a new cluster with the URLs $u_t$ and intensities $n_t$. When faced with a long stream of data, splitting clusters and deleting unused clusters may be necessary.

Summary

Figure 6:
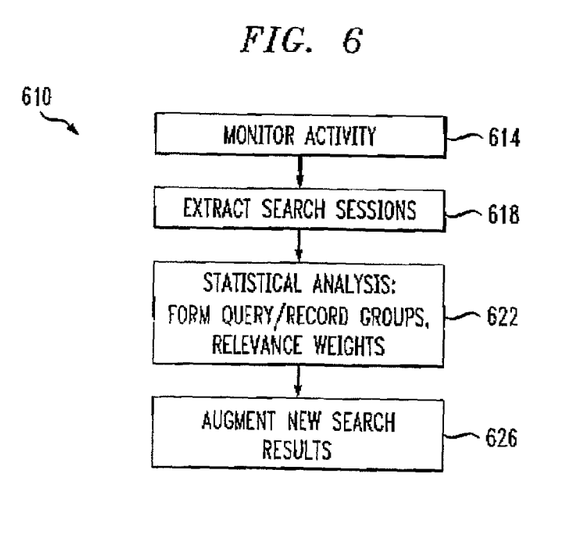
FIG. 6 is a flow diagram summarizing a method for organizing records of a database by topical relevance.

Referring to FIG. 6, the present invention concerns a method (1010) for improving the standard search facility for a database. The activities of a community of users are monitored as they search the database (step 614). With each search, a user is presented with a list of indices for records in the database. Preferably this list also summarizes each of the potentially relevant records. The user reviews the list and accesses records that appear (from the accompanying information) to be related to their search terms. The user's search terms together with the indices of the items they access are combined to form a search session (step 618). The extraction of search sessions can happen either when the session has ended (known as on-line processing) or periodically in a batch, say, processing a log file of user activities once a day (known as off-line processing).

The extracted search sessions are then used to formulate groups of semantically related queries, and to associate with each group a set of relevance weights, or technically, the probabilities that each record satisfies the queries in each group (step 622). In an exemplary embodiment, the formation of query groups and relevance weights is accomplished by fitting a mixture model. In this case, a probability distribution is constructed that describes how the data were generated. In other embodiments, the clustering of queries and the determination of relevance weights can be done in separate steps. In still another embodiment, groups of records could also be formed from the search session data, in which case the relevance weights would associate query groups and record groups. This computation could be done either in one step (by formulating a slightly more elaborate mixture model) or in two or more separate steps. This processing can be done either for each new search session (on-line processing) or at regular intervals in batch mode (off-line processing).

The essential byproduct of this component of the invention is a collection of query groups and relevance weights. We use this data to aid users with future searches. In addition to the output from the standard search facility, we also present the user with an additional display built from our table of query groups and relevance weights (step 626). Given a new query, the present invention first identifies one or more query groups based on the search terms of the query. Then, for each group, indices for the most relevant records in each group are presented to the user. This list of indices is stratified by query group, making it easier to browse the search results.

The user population referred to above is preferably a community of users with something in common. For example, the user community can be the workers of a company or organization, mobile device users in a particular location, or users that are grouped together because of common interests or habits. The method 610 of improving Web search is beneficially applied to these kinds of user populations because the common interest or aspect of the community can be used to automatically narrow or fine tune search results. For example, where a user population is defined as Bell Lab workers, search results related to the search term "ATM", the reliance on population search path statistics of the method 610 of improving Web search may direct users to pages containing information about Asynchronous Transfer Mode switches. At the same time, where a user population is defined as mobile device users, search results related to the search term "ATM" might be supplemented with a list giving priority to Web pages containing information about the location of Automatic Teller Machines. Similarly, where a user population is defined as mobile device users in New York, searches for "restaurants" are supplemented with lists of pages prioritized toward those with information about restaurants near them in New York. Such users are relieved from having to wade through information about restaurants in Chicago and elsewhere.

The methods of this invention such as those summarized in FIG. 6 may be implemented in a variety of communication and computing environments. As explained above, for example, they may be implemented in proxy servers, search engine provider hardware, gateways, and other points in database or Internet search paths. With a full understanding of the present invention, those of skill in the art will readily determine suitable hardware and software configurations for their particular applications.

Figure 7:
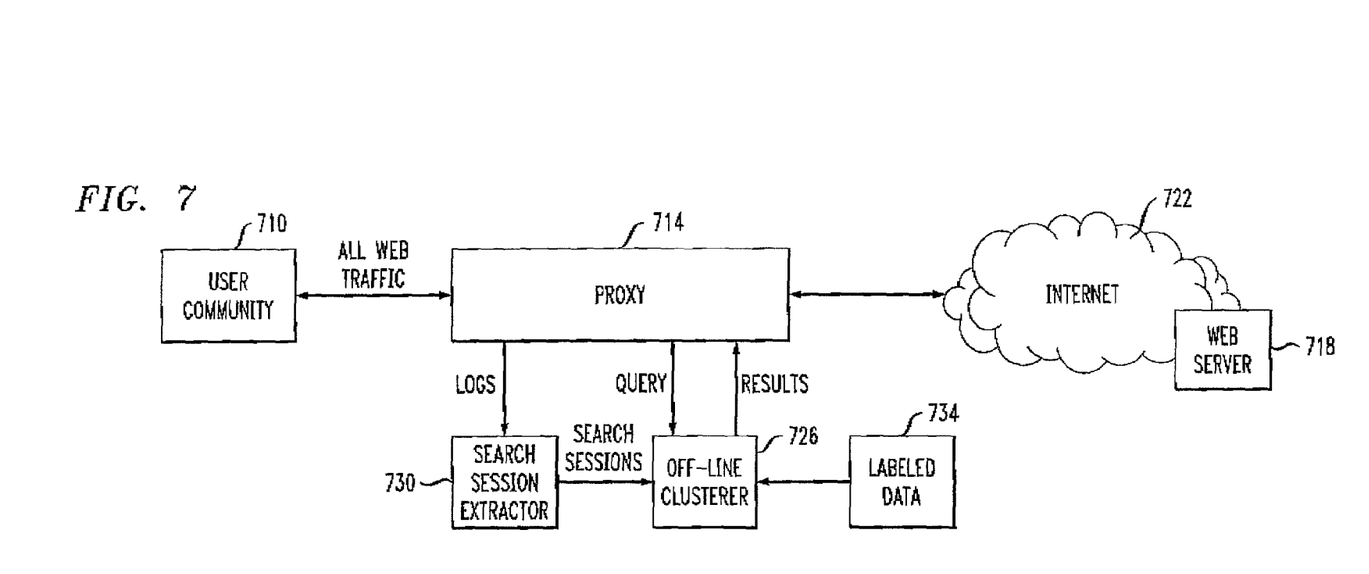
FIG. 7 is a block diagram illustrating a first system operative to implement aspects of the methods of the invention.
Figure 8:
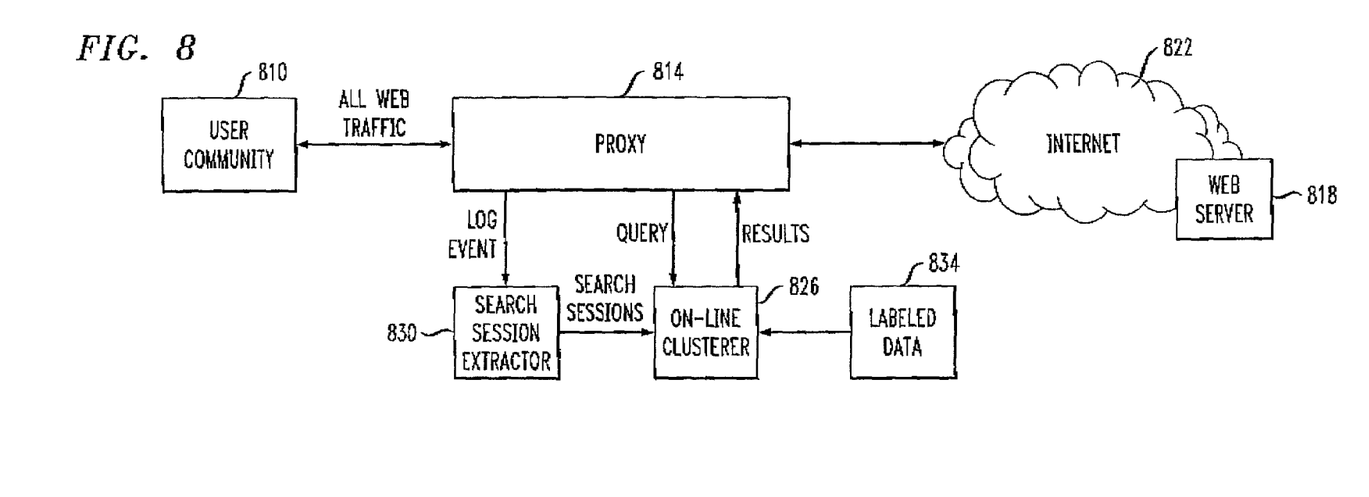
FIG. 8 is a block diagram illustrating a second system operative to implement aspects of the methods of the invention.

For example, with reference to FIG. 7 and FIG. 8, a user in a user community 710, 810 uses a web browser to access a Web search engine such as Google or Yahoo. All of the web traffic generated by the user goes through a web proxy server 714, 814, so the request for a search engine also does. Once the proxy server 714, 814 determines that the request is a search engine request, it routes it on to the search engine, which is a Web server 718, 818 in the Internet 722, 822, and also sends the query to a Clusterer 726, 826. The Clusterer 726, 826 sends records whose probabilities have passed a threshold. The records are maintained in tables in the Clusterer 726, 826.

These tables are generated using search session data and/or labeled data 734, 834. If the Clusterer is an on-line Clusterer 826, the search session data is input into the Clusterer 826 as individual search sessions from search session extractor 830. If the Clusterer is an off-line Clusterer 726, the search session data is batched by the Search Session Extractor 730, perhaps batching by a 24-hour period. Certain versions of the Clusterer 726, 826 might use labeled data 734, 834 in its algorithms.

The input into the Search Session Extractor 730, 830 is the proxy access logs. If the Clusterer is on-line, each log event is sent to the Extractor as it occurs. Otherwise, a batch of log events are sent.

Clearly, there are different types of searches that users perform; sometimes, there is one desired page (e.g., a conference call-for-papers announcement), and other times, the searching process of visiting many pages allows the user to find the desired information (e.g., what is available on the Web about wireless handsets). In addition, the user can use the desired page as a jump-off point for further exploration. SearchLight is most successful when one page is desired. Hyponym is successful for both types of searching.

The invention has been described with reference to particular embodiments. Modifications and alterations will occur to others upon reading and understanding this specification. It is intended that all such modifications and alterations are included insofar as they come within the scope of the appended claims or equivalents thereof.

We claim:

1. A method of improving search of a database, the method comprising:
   monitoring user search activity including search queries and paths in a user population;
   summarizing the user search activity into search sessions, wherein a search session is defined by search queries and paths;
   determining groups of semantically related queries or paths based on patterns of access as recorded by the search sessions;
   determining probabilities that records in the database are relevant for each query or path group;
   maintaining a table associating an index for each record in the database with the probability that the record is relevant for each query or path group; and,
   supplementing search results with information regarding records from the database with tabulated relevance probabilities.

2. The method of improving database search of claim 1 wherein the search is web page search and the database includes a collection of available web pages.

3. The method of improving database search of claim 1 wherein the search is web page search and the database includes a collection of publicly available Internet web pages.

4. The method of improving database search of claim 1 wherein the search is web page search and the database includes a collection of private intranet web pages.

5. The method of improving database search of claim 2 wherein monitoring user search activity in a user population and extracting search sessions from user search activity includes off-line processing of proxy server access logs to determine search sessions.

6. The method of improving database search of claim 2 wherein monitoring user search activity in a user population and extracting search sessions from user search activity includes on-line processing in a proxy server to determine search sessions.

7. The method of improving database search of claim 2 wherein monitoring user search activity in a user population and extracting search sessions from user search activity includes off-line processing of proxy server access logs to determine complete search sessions.

8. The method of improving database search of claim 2 wherein monitoring user search activity in a user population and extracting search sessions from user search activity includes on-line processing in a proxy server to determine complete search sessions.

9. The method of improving database search of claim 1 includes extracting topic sessions, defined by multiple search sessions where the queries include refinements, from user search activity.

10. The method of improving database search of claim 1 wherein determining groups of semantically related queries or paths based on search session data and determining probabilities that records in the database are relevant for each query or path group includes clustering queries based on a similarity of the associated search paths using a Poisson mixture model.

11. The method of improving database search of claim 1 wherein determining groups of semantically related queries or paths based on search session data and determining probabilities that records in the database are relevant for each query or path group includes using predetermined labeled data.

12. The method of improving database search of claim 11 wherein determining groups of semantically related queries or paths based on search session data and determining probabilities that records in the database are relevant for each query or path group includes applying an approximate Expectation-Maximization algorithm to the predetermined labeled data.

13. The method of improving database search of claim 11 wherein determining groups of semantically related queries or paths based on search session data and determining probabilities that records in the database are relevant for each query or path group includes using predetermined labeled data by seeding query or path groups.

14. The method of improving database search of claim 1 wherein determining groups of semantically related queries or paths based on search session data and determining probabilities that records in the database are relevant for each query or path group includes clustering queries or paths in an on-line fashion.

15. The method of improving database search of claim 1 wherein maintaining a table associating the index for each record includes using a database to store the table.

16. The method of improving database search of claim 1 wherein supplementing search results with information regarding records from the database with tabulated relevance probabilities includes displaying the information in a separate area of the display from results of a search engine.

17. The method of improving database search of claim 1 wherein supplementing search results with information regarding records from the database with tabulated relevance probabilities includes modifying the order of the information.

18. The method of improving database search of claim 1 wherein determining groups of semantically related queries or paths based on search session data and determining probabilities that records in the database are relevant for each query or path group includes clustering data.

19. The method of improving database search of claim 1 wherein determining groups of semantically related queries based on search session data and determining probabilities that records in the database are relevant for each query group includes clustering queries based on a similarity of items in their associated search paths.

20. The method of improving database search of claim 19 wherein determining groups of semantically related queries or paths based on search session data and determining probabilities that records in the database are relevant for each query or path group includes clustering queries or paths using an Expectation-Maximization algorithm.

21. A method of improving search of a database, the method comprising:
- monitoring user search activity including search queries and paths in a user population;
- summarizing the user search activity into search sessions, wherein a search session is defined by search queries and paths;
- determining groups of semantically related paths based on patterns of access recorded by the search sessions;
- determining probabilities that records in the database are relevant for each path group;
- maintaining a table associating an index for each record in the database with the probability that the record is relevant for each path group; and,
- supplementing search results with information regarding records from the database with tabulated relevance probabilities.

22. A method of improving search of a database, the method comprising:
- monitoring user search activity including search queries and paths in a user population;
- summarizing the user search activity into search sessions, wherein a search session is defined by search queries and paths;
- determining groups of semantically related queries based on patterns of access recorded by the search sessions;
- determining probabilities that records in the database are relevant for each query group;
- maintaining a table associating an index for each record in the database with the probability that the record is relevant for each query group; and,
- supplementing search results with information regarding records from the database with tabulated relevance probabilities.

23. A method of improving search of a database, the method comprising:
- monitoring user access including search queries and paths to a standard search facility of a database;
- summarizing the sequence of user activity during searching tasks into search sessions, wherein a search session is defined by queries and paths;
- determining groups of semantically related queries or paths based on patterns of access as recorded by the search sessions;
- determining probabilities that records in the database are relevant for each query or path group;
- tabulating relevance weights based upon the probabilities;
- maintaining a table associating an index for each record in the database with the relevance weight for that record for each query or path group;
- supplementing search results with information regarding records from the database with the relevance weights.

* * * * *